Dec. 10, 1963  J. R. WATSON  3,113,432
METHOD AND APPARATUS FOR CONTROLLING HIGH
PRESSURE FLUID BY LOW PRESSURE BLOCKING
Filed April 14, 1960  2 Sheets-Sheet 1

INVENTOR.
John R. Watson
BY
Lieber, Lieber & Nilles
Attorneys

Dec. 10, 1963  J. R. WATSON  3,113,432
METHOD AND APPARATUS FOR CONTROLLING HIGH
PRESSURE FLUID BY LOW PRESSURE BLOCKING
Filed April 14, 1960  2 Sheets-Sheet 2
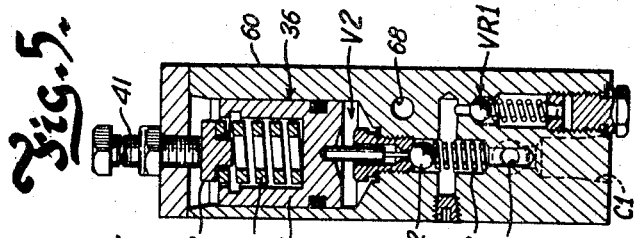
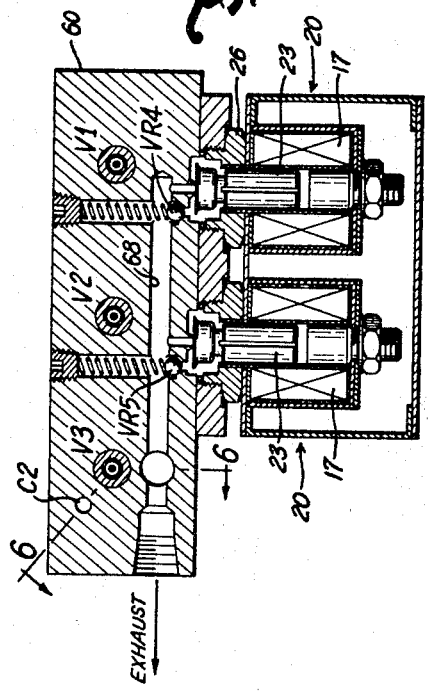
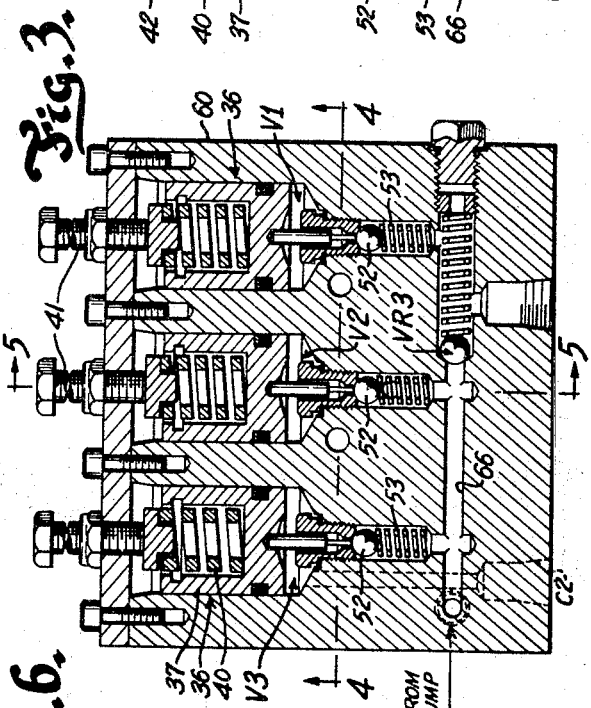
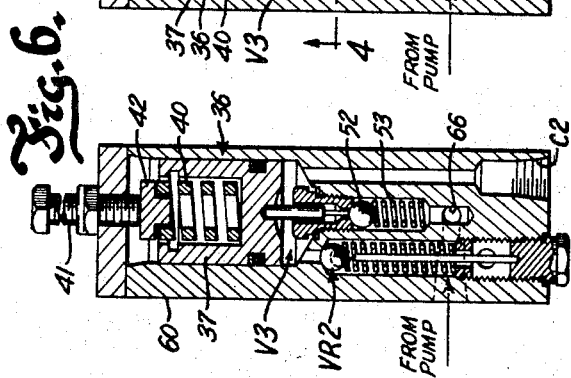
INVENTOR.
John R. Watson
BY
Lieber, Lieber & Nilles
Attorneys United States Patent Office 3,113,432
Patented Dec. 10, 1963

3,113,432
METHOD AND APPARATUS FOR CONTROLLING HIGH PRESSURE FLUID BY LOW PRESSURE BLOCKING
John R. Watson, Omaha, Nebr., assignor to Applied Power Industries, Inc., a corporation of Wisconsin
Filed Apr. 14, 1960, Ser. No. 22,271
5 Claims. (Cl. 60—52)

This invention relates to hydraulic control valves of the remotely operable type.

Heretofore, remotely controlled hydraulic valves generally contained numerous devices such as electrical switches, solenoids or the like, and these devices usually actuated three or four-way valves, all of which required duplication of parts, were complex and expensive.

Accordingly, the present invention provides a versatile and remotely controlled valve which contains a minimum of parts to perform its intended functions.

In accordance with the present invention, a remotely operable hydraulic control valve assembly is provided which includes a remotely actuated, low pressure, two-way valve that operates a pressure reducing valve.

The method and apparatus to be disclosed are intended to control high pressure fluids responsive to a simple low pressure blocking valve actuation. An intermediate variable volume chamber is interposed between the downstream low pressure blocking valve and a high pressure positive seal reducing valve in such a manner that variations in the volume of the chamber are translated into actuation of the high pressure reducing valve, which in turn dumps fluid into the variable chamber where the pressure is preselected by a preset loading of the movable member in the variable chamber. The solenoid operated type low pressure valve disclosed is inexpensive and highly reliable. The variable chamber, and high pressure ball valve construction are inherently economical since close tolerances are not essential to satisfactory operation. Thus, by combining the several elements of both the method and apparatus, control of high pressure fluids by low pressure blocking is achieved at a cost heretofore unattainable with the performance achieved. In addition, a compact apparatus for practicing the method results from the teaching of the invention.

A more specific aspect of the invention relates to an assembly of the above type wherein the two-way valve is normally closed under which condition the pressure reducing valve is also closed. When the two-way valve is opened by remotely operated means, pressure is relieved from one side of a spring biased operator in response to which the operator, which is set to overcome the maximum pressure in the line, immediately opens a predetermined high pressure line to exhaust.

The above mentioned control valve can be utilized, for example, to remotely control a motor such as a single acting hydraulic cylinder and piston unit simply by pushing one of two push button switches to select the direction of unit movement.

In addition, more than one of these assemblies may be used together to remotely control a reversible motor such as a double acting cylinder and piston unit, in which installation the assemblies may be banked together as an integral and self-contained package. Furthermore, another pressure reducing valve, without its actuating two-way valve, may be used to act as a pressure regulator.

These and other objects and advantages will appear hereinafter as this disclosure progresses, reference being had to the accompanying drawings, in which:

FIGURE 3 is a longitudinal cross-sectional view of the valves shown in FIGURE 2 and when banked together as an integral package to form a four-way valve unit;

FIGURE 4 is a sectional view taken on line 4—4 in FIGURE 3;

FIGURE 5 is a vertical section taken on line 5—5 in FIGURE 3, and

FIGURE 6 is a vertical section taken along line 6—6 in FIGURE 4.

Figure 1:
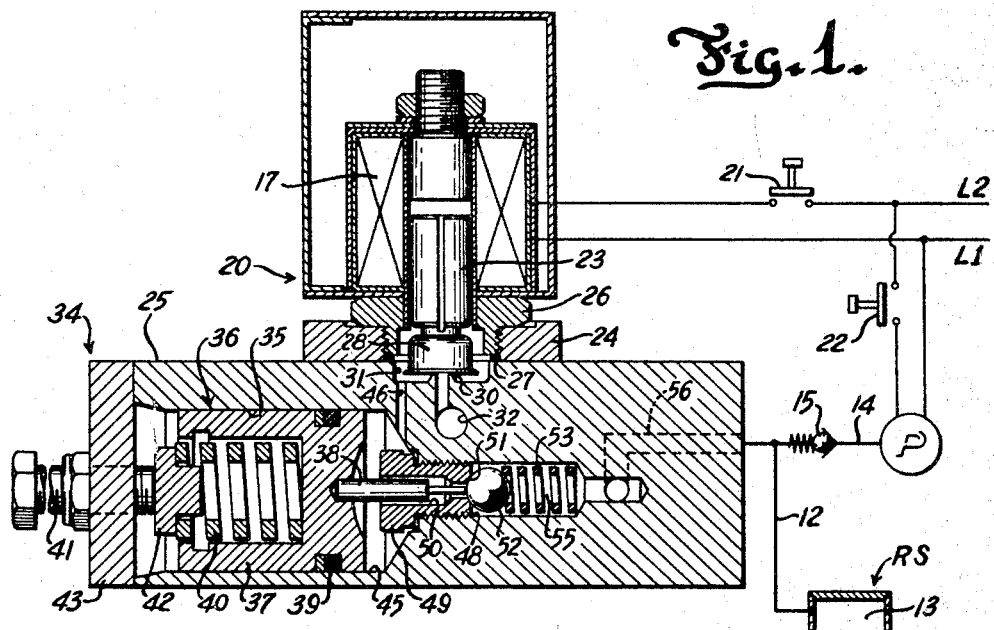
FIGURE 1 is a cross sectional view of a remote control valve made in accordance with the present invention and schematically showing it as used to control a single acting cylinder-piston unit.

Referring in greater detail to FIGURE 1, a hydraulic motor means comprising a conventional single acting ram RS has a piston 10 which is returned to the contracted position by a spring 11. A conduit 12 places the head end of the cylinder 13 in pressure fluid receiving communication with the pump P via conduit 14 and the check valve 15.

The fluid pump P is driven in any conventional manner, as for example, by an electric motor (not shown) which receives its power from the electric lines L1, L2. The power lines L1 and L2 also furnish power to the solenoid coil 17 of the low-pressure blocking means, two-way valve assembly 20.

Electrical switches 21 and 22, which may be of the simple spring returned, normally open and manually depressed type are located in line L2 leading to the pump and coil, respectively.

The two-way valve assembly 20 includes the coil 17 in which the plunger 23 is reciprocable between the lower deactivated position shown, and a raised, valve open position. The solenoid is mounted on the plate 24 secured to the valve housing 25, by means of the threaded nut 26 which is threadedably engaged in the tapped plate.

A suitable flexible seating ring 27 is located between the nut 26 and housing 25.

The lower end of the plunger 23 carries a valve element 28 which, when in the position shown, sealingly bears against the valve seat 30 formed in the chamber 31 of the housing and thereby closes the exhaust passage 32, which may lead to the fluid reservoir (not shown) of the system.

The high pressure blocking means or pressure reducing valve, designated generally by the numeral 34, has a large bore 35 extending partially therethrough and in which the spring biased valve operator 36 is reciprocable. This operator takes the form of a piston 37 having a stem 38 fixed at one end and an O-ring 39 which sealingly engages the bore. The piston is urged to the right, as viewed in FIGURE 1, that is, to the valve open position, by the spring 40. The biasing action of the spring is adjustable by the stud 41 which threadably extends through the cap plate 43, and the inner end of which stud urges the plug 42 against the spring in seating relationship thereon.

The inner end of bore 35 forms what is normally a low-pressure chamber 45, and this chamber is in fluid communication with the chamber 31 through the passage 46.

A smaller bore 48 is formed in axial alignment with bore 35 and has a plug 49 threadably engaged therein. This plug has a passage 50 extending axially therethrough, and through which passage the piston stem 38 extends. The diameter of the stem is less than that of the bore 50 in order to permit fluid to flow therebetween.

On the side of the plug opposite to the piston is located the valve seat 51 against which the valve element or ball 52 is adapted to bear. This ball is urged by its spring 53 to the sealing position against the seat 51 in the plug.

The portion of bore 48 located on the opposite side of the plug from the chamber 45 forms a high pressure chamber 55 which is in communication via passage 56 with high pressure conduit 14.

The pressure fluid furnished by the pump to the ram RS is thus also conducted into the high pressure chamber 55 of the pressure reducing valve 34. When the valve element 28 is in the closed position shown in FIGURE 1, the reduced pressure in the low pressure chamber 45 is sufficient to overcome the force of spring 40 and thus the valve ball 52 is retained in the seated position by the high pressure of the pump.

Stated otherwise, this reduced pressure in chamber 45 occurs since the area of the ball seat 51 is considerably less than the area of piston 37, and as the pressure in chamber 45 rises, the piston moves to the left, allowing ball 52 to seat. The pressure at which this occurs will be in the same proportion to the total pressure as the area of the seat 51 is to the diameter of the piston.

The setting of the adjustable stud 41 is such that the spring 40 will urge the piston and its stem 38 to the right (valve 52 open position) when the pressure in chamber 45 falls to zero. In other words, when the pressure in chamber 45 is reduced by opening of the solenoid operated valve 28, the piston 37 is urged to the right, against any pressure provided by the pump P in the high pressure chamber 55.

The operation of the FIGURE 1 device is as follows: When switch 22 is depressed, the pump delivers oil through check ball 15 to the cylinder 13, extending the piston. Assume a certain pressure has been set on spring 40 by the adjustment means 41, so that the piston can exert a force of, for example, 300 p.s.i. in chamber 45. The pressure in chamber 45 is reduced by the opening of the ball 52 of valve means 34 to some proportion of the high pressure in the pump line, as long as the pressure in chamber 45 is less than 300 p.s.i. In other words, whenever the pressure in chamber 45 is less than the predetermined pressure value exerted by spring 40, then the pressure in chamber 45 is proportionate to the pressure in the pump line 14.

However, when the pressure in the pump line 14 rises to a certain point where the pressure in chamber 45 exceeds the predetermined pressure setting of spring 40, then no longer is the pressure in chamber 45 proportionate to the pump line pressure. Instead, the pressure in chamber 45 remains constant after that certain high pressure is reached or exceeded in the pump line.

This arrangement provides a highly desirable type of control, namely the ability to control a varying high pressure line for any pressure in that line over a certain value, which control can be accomplished by a low-pressure control valve having a constant pressure in its control chamber. This pump pressure is reduced, by the opening of the ball 52 of valve means 34 so that the pressure in the chamber 45 is some proportion of the pump line pressure.

When switch 22 is released, the flow of pressure fluid ceases, thus stopping movement of the piston 10 and check ball 15 holds the piston in this position.

Thus, the high pressure blocking means 34 responds to a predetermined pressure of the hydraulic fluid downstream of the means 34 to establish a positive seal by expanding the chamber 45 and seating the operator 52 on the valve seat 51. The positive seal is promoted by the high pressure upstream of operator 52 urging the operator against its seat. Establishment of the positive seal shuts off all flow into and out of the chamber 45 and traps a volume of hydraulic fluid at said predetermined pressure in the chamber. "Stage blocking" refers to the sequence of selectively blocking the path to exhaust and establishing the positive seal. The trapped volume of fluid is maintained in the chamber and resides between the positive seal (51, 52) and the low pressure blocking means (two-way valve 28) until the latter is selectively operated to unblock the path to exhaust.

In this fashion the direction of motor operation is controlled by stage blocking upon completion of which the piston 10 moves to compress spring 11. When the piston 10 has made a full stroke the piston (motor) is reversed by releasing the pressure in the chamber 45. The release of pressure is accomplished by opening valve 28 to unblock the path to exhaust, in response to which the trapped fluid pressure in chamber 45 drops, the positive seal at 51, 52 is disestablished, and the pressure above the piston 10 (as reviewed in FIG. 1) is released to exhaust via valve seat 51, chamber 45, and valve seat 30, and the various connecting passages.

It is to be noted that during the initial phase of operation substantially all of the pump discharge flows into chamber 45. When the positive seal is established, however, all of the pump discharge is then directed into the motor.

When it is desired to release or retract the piston 10, switch 21 is depressed which energizes the solenoid 17, thus raising valve element 28 from its seat 30. This vents the chamber 45 to exhaust via passage 46, chamber 31 and passage 32. As a result, the spring 40 urges piston 37 to the right, and opens valve 52. Fluid pressure is thereby exhausted from the cylinder through the reducing valve 34 and out passage 32.

In this manner, the remotely located switches 21 and 22 are used respectively to retract or extend the ram as desired.

Referring now to FIGURES 2 to 6, inclusive, the invention has been illustrated as utilizing two control valves V1 and V2 which are of the type shown in FIGURE 1, but mounted in a single housing 60. This arrangement is used to control a double acting ram RD, which includes the cylinder 61 and piston 62. Certain pressure settings will be mentioned in connection with the description of the invention, and are used for illustrative purposes only.

Figure 2:
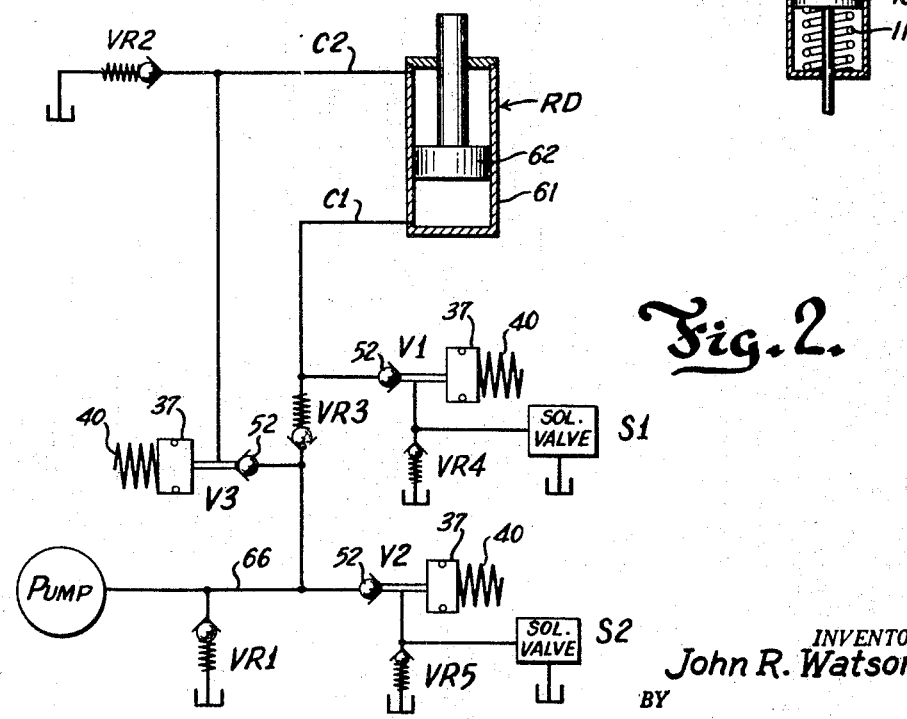
FIGURE 2 is a schematic diagram showing two of the remote control valves as used to control a double acting hydraulic ram.

A valve V3 is also utilized in the FIGURE 2 device and this valve is also similar to the FIGURE 1 valve but it is not actuated by a solenoid. Valve V3 is a pressure valve which is set to open below a certain pressure, say 800 p.s.i., and close above that pressure. The relief valve VR2 in conduit C2 is set to close the cylinder return valve V3, and this valve VR2 would be set, for example, to open at 1000 to 1500 p.s.i.

Conduits C1 and C2 place the opposite ends of the ram RD in communication with the housing 60.

Parts of valves V1, V2 and V3 which are similar to corresponding parts of the FIGURE 1 device, have been correspondingly numbered.

VR1 is the main overload relief valve which is located in the main discharge line 66 from the pump and can be set to open at any desired pressure. As shown in FIGURE 5 this valve is built into the housing 60.

VR3 (FIGURES 2 and 3) is also a conventional relief valve and is used to block the load pressure and set the maximum return pressure. The setting of this valve would be about 500 p.s.i. in the present illustration.

Valves VR4 and VR5 (FIGURES 2 and 4) are contional spring loaded, ball, relief valves which are set for this illustration at 350 p.s.i. These valves are used to prevent overload on the solenoid valves and serve to dump excess pressure fluid directly into the common exhaust passage 68 (FIGURE 4) which extends outwardly from the housing 60.

Control valves V1 and V2 would both be set to close at 300 p.s.i.

Valve V1 serves as a release valve for the cylinder load and is operated by the solenoid valve S1. In other words, the solenoid valve S1 dumps the pressure from valve V1 to exhaust—it is open when the ram RD is being retracted.

Valve V2 unloads the pump to exhaust and is operated by the solenoid valve S2. This solenoid valve S2 is closed when the ram is extending or retracting, and it is open on idle to by-pass pump fluid to tank. Valve V2 and its solenoid valve S2 permits continuous operation of the pump and eliminates the necessity for turning the pump off when the ram is not being actuated.

The remotely controlled valve assembly shown in FIGURE 1 can also be utilized in other numbers and arrangements than that shown in FIGURES 2 to 6, the latter of which are simply illustrative of the versatility of this easily controlled valve assembly of simple design.

In either form of utilization of the invention, the valve can control a high pressure line having varying pressure by means of a remotely and easily actuated pressure reducing valve having a constant pressure control chamber. The predetermined maximum pressure of the control chamber is adjustable.

Various modes of carrying out the invention are contemplated as being within the scope of the following claims particularly pointing out and distinctly claiming the subject matter which is regarded as the invention.

What is claimed and desired to be secured by Letters Patent is:

1. For use with a double acting fluid motor having a cylinder and a piston therein, said piston having a work side and a return side, a valve comprising, in combination a plurality of regulating means defining a plurality of pressure regulating chambers, each such means having an operating piston yieldably urged by a predetermined force to contract the chamber, each such operating piston having a check valve opened by each such operating piston upon contraction of the chamber, and means communicating between the check valve and chamber;

one of the regulating means being connected to pump pressure, a low pressure remotely controlled dump connection to tank communicating with the chamber of said one regulating means;

a second of the regulating means being connected to said pump pressure, said second regulating means having a low pressure remotely controlled dump connection to tank, communicating with a second of said regulating means chamber, said second regulating means pump connection being also in open communication with the work side of the double acting motor piston, and a third of the regulating means connected to the pump pressure between the first and second means, the chamber of said third regulating means having a direct connection to the return side of the double acting motor piston;

the whole in such combination that (1) the double acting motor piston responds to pressure on its return side upon opening the low pressure dump connection to tank of said second regulating means, and (2) upon opening said first regulating means dump connection to tank the double acting motor piston is maintained in place, and the pump pressure is by-passed to tank, the work side of said double acting motor piston is subjected to working pressure when the first regulating means and second regulating means have their low pressure dump connections closed.

2. A method for controlling the operation of a hydraulic motor comprising the steps of pumping hydraulic fluid into a first pre-established flow path connected to deliver said fluid to said motor and to a second flow path to exhaust; blocking said second flow path with a blocking means for preventing flow to exhaust therethrough;

establishing in said second flow path upstream of said blocking means a variable volume chamber and a reducing means for reducing pressure in said second flow path between said chamber and said first flow path;

during said pumping step, directing at least a portion of the hydraulic fluid through said reducing means into said chamber;

trapping such portion in said chamber between said blocking means and said reducing means by closing the reducing means to prevent flow into or out of said chamber;

continuing said pumping to thereby operate said motor on one direction of operation; and unblocking said second flow path by removing said blocking means to exhaust and opening said reducing means thereby controlling the operation of the motor by diverting hydraulic fluid from the motor.

3. A controllable hydraulic system comprising in combination a hydraulic pump having a discharge for delivering fluid;

a reversable hydraulic motor, having first and second fluid passageways, for operating in one direction responsive to the pressure of fluid received through one of said passageways;

a first conduit connected between said pump and said first passageway of said motor;

a first check valve disposed in said first conduit;

a second conduit and a third conduit both connected to exhaust and respectively connected upstream and downstream of said first check valve;

a fourth conduit connected between said second passageway of said motor and exhaust;

a second check valve means disposed in said fourth conduit for directing fluid from said motor second passageway to exhaust responsive to a fluid pressure at least equal to a first predetermined pressure that is less than the pressure of fluid received by said motor through said first passageway;

a fifth conduit connected at one end upstream of said first check valve and at the other end to said motor second passageway;

a third check valve means, disposed in said fifth conduit, for passing fluid toward said motor second passageway only in response to a pressure that is equal to or less than a second predetermined pressure representative of the pressure at said motor second passageway, said second predetermined pressure being less than said first predetermined pressure;

first and second means for selectively controlling the dierction of operation of said motor and being respectively disposed in said third and second conduits;

each of said first and second means for selectively controlling the direction of operation of said motor further including a high pressure blocking means disposed in each of said second and third conduits for responding to a third predetermined pressure in the respective conduit downstream of said high pressure blocking means by establishing a positive seal to stop flow in either direction through said blocking means, said third predetermined pressure being intermediate said second predetermined pressure and exhaust and confined within a variable chamber the variations of which serve to actuate the high pressure blocking means; and a low pressure blocking valve disposed in each of said second and third conduits between each of said high pressure blocking means and exhaust, whereby sequential selective blocking of flow through each of said second and third conduits is achieved by closing said low pressure blocking valve and operating said pump whereupon said high pressure blocking means establishes said positive seal responsive to said predetermined pressure.

4. A packaged valve assembly unit for achieving flow control comprising in combination a generally rectangular body with first and second sides and first and second ends defining the edges of the front and back of said body;

respective first, second and third large diameter passages extending from said first side partially toward said second side;
means for sealing said first side over said first, second and third large passages;
said body having therein—
an inlet passageway extending generally parallel to and adjacent said second side from said first end;
respective first, second and third small diameter passages extending respectively from said inlet passage to said first, second and third large passages;
a first check valve disposed in said inlet passage and oriented to prevent flow from said first to said second small diameter passages;
a first outlet passage connected to said first inlet passage in open communication with, and on the same side of said first check valve as, said first small diameter passage;
a valve seat fixed in each of said small diameter passages;
a movable ball valve mounted in each of said small diameter passages to engage its respective seat;
a piston sealingly engaging the walls of, and mounted for movement in, each of said large diameter passages, thereby defining first, second and third chambers in each of said first, second and third large diameter passages, respectively;
a spring mounted between each of said pistons and said plate to bias said piston toward its corresponding small passage;
each of said valve seats being disposed between the respective corresponding ball valve and piston;
a rod extending from each of said pistons into engagement with the corresponding one of said balls whereby said spring normally biases said ball off said seat via said rod;
a second outlet passage leading out of said third chamber;
a third outlet passage;
first and second connecting passages between said third outlet passage and said first and second chambers, respectively;
means in each of said first and second connecting passages for receiving a valve therein;
a fourth outlet passage from said third chamber; and
a second check valve in said fourth outlet passage.

5. A controllable hydraulic system comprising in combination,
a hydraulic pump for delivering high pressure fluid;
a hydraulic motor for operation by pressurized fluid discharged from said pump;
a first high pressure conduit connected between said pump and said motor;
a second high pressure conduit connected to said first high pressure conduit and an exhaust passage;
a low pressure actuated high pressure positive seal bypass valve means interposed between the second high pressure conduit and the exhaust passage,
said by-pass valve means having a high pressure positive seal blocking means normally urged into its sealing position by the pressure of the high pressure fluid;
means defining a low pressure variable volume chamber with a predetermined preset minimal loading in which a yieldably loaded piston defines one end of the variable volume chamber;
high pressure positive seal blocking means, operator means fixed to the yieldably loaded piston which opens and closes the high pressure blocking means responsive to variations in the volume of the variable volume chamber permitting high pressure fluid to enter the variable volume chamber when in the open position;
and a low pressure blocking valve downstream from the variable volume chamber which opens or closes the path from the variable volume chamber to the exhaust passage whereby sequential selective blocking of the path from high pressure pump fluid to the exhaust passage is initiated and controlled in response to the operation of the low pressure valve.

References Cited in the file of this patent
UNITED STATES PATENTS

| | | |
|---|---|---|
| 1,003,916 | Koeng | Sept. 19, 1911 |
| 2,164,511 | Furlong | July 4, 1939 |
| 2,198,049 | Dinzl | Apr. 23, 1940 |
| 2,267,177 | Twyman | Dec. 23, 1941 |
| 2,280,291 | Jaseph | Apr. 21, 1942 |
| 2,746,251 | Ashton | May 22, 1956 |

FOREIGN PATENTS

| | | |
|---|---|---|
| 555,393 | France | 1923 |
| 835,760 | France | Oct. 3, 1938 |